(12) United States Patent
Rajasekharan et al.

(10) Patent No.: US 9,720,763 B2
(45) Date of Patent: Aug. 1, 2017

(54) PROACTIVE CLOUD ORCHESTRATION

(71) Applicant: SEAGATE TECHNOLOGY LLC, Cupertino, CA (US)

(72) Inventors: Ajaykumar Rajasekharan, Longmont, CO (US); Christian Brunn Madsen, Longmont, CO (US); Andrei Khurshudov, Niwot, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 143 days.

(21) Appl. No.: 14/642,547

(22) Filed: Mar. 9, 2015

(65) Prior Publication Data
US 2016/0266962 A1    Sep. 15, 2016

(51) Int. Cl.
| | |
|---|---|
| *G06F 11/00* | (2006.01) |
| *G06F 11/07* | (2006.01) |
| *H04L 29/08* | (2006.01) |
| *H04L 12/24* | (2006.01) |

(Continued)

(52) U.S. Cl.
CPC .......... *G06F 11/0793* (2013.01); *G06F 9/50* (2013.01); *G06F 11/0709* (2013.01);
(Continued)

(58) Field of Classification Search
CPC ............ G06F 11/0793; G06F 11/0709; G06F 11/0751; G06F 11/079; G06F 11/004; G06F 11/008; G06F 11/0754; G06F 11/0796; G06F 11/3006; G06F 11/3055; G06F 11/0703; G06F 11/3452; G06F 9/50; H04L 41/0816; H04L 43/0823; H04L 67/10; H04L 41/0672; H04L 41/142; H04L 41/145; H04L 43/16; H04L 69/40

(Continued)

(56) References Cited

U.S. PATENT DOCUMENTS 7,539,907 B1 *  5/2009  Johnsen ................ G06F 11/008
                                                    714/26
8,572,706 B2   10/2013  Lucovsky et al.
(Continued)

OTHER PUBLICATIONS

Fulp, Env., et al., "Predicting Computer System Failures Using Support Vector Machines," Nov. 10, 2008, (8 pp.).

(Continued)

*Primary Examiner* — Joseph D Manoskey
(74) *Attorney, Agent, or Firm* — Holland & Hart LLP

(57) ABSTRACT

Methods, systems, and devices are described for providing proactive cloud orchestration services for a cloud hardware infrastructure. A health management system may monitor component(s) of the cloud hardware infrastructure. The health management system may determine a failure probability metric for the component(s) based on the monitoring of the component and in consideration of historical information associated with the component, or similar components. The health management system may determine an optimization strategy for the component and, when an optimization decision has been reached, initiate a reconfiguration procedure to implement the optimization strategy. The optimization strategy may provide for mitigating or eliminating the consequences of the component failure associated with data loss, downtime, and the like.

20 Claims, 7 Drawing Sheets

(51) Int. Cl.
*G06F 9/50* (2006.01)
*H04L 29/14* (2006.01)
*H04L 12/26* (2006.01)

(52) U.S. Cl.
CPC ........ *G06F 11/079* (2013.01); *G06F 11/0751* (2013.01); *H04L 41/0672* (2013.01); *H04L 41/142* (2013.01); *H04L 67/10* (2013.01); *H04L 69/40* (2013.01); *H04L 41/145* (2013.01); *H04L 43/0823* (2013.01); *H04L 43/16* (2013.01)

(58) Field of Classification Search
USPC ..... 714/4.1, 4.11, 4.4, 6.2, 6.3, 6.32, 26, 33, 714/47.1, 47.2, 47.3
See application file for complete search history.

(56) References Cited

U.S. PATENT DOCUMENTS

| | | | |
|---|---|---|---|
| 8,898,514 B2 | 11/2014 | Myrah et al. | |
| 9,037,921 B1 * | 5/2015 | Brooker | G06F 12/02 369/53.1 |
| 9,229,796 B1 * | 1/2016 | Ma | G06F 11/008 |
| 9,274,902 B1 * | 3/2016 | Morley | G06F 11/2002 |
| 2013/0191527 A1 | 7/2013 | Ashok et al. | |
| 2013/0283104 A1 * | 10/2013 | Hosking | G06Q 10/109 714/47.3 |
| 2014/0101298 A1 * | 4/2014 | Shukla | H04L 41/5006 709/223 |
| 2015/0193325 A1 * | 7/2015 | Harsan-Farr | G06F 11/008 702/186 |
| 2015/0261630 A1 * | 9/2015 | Endo | G06F 11/2025 714/4.11 |

OTHER PUBLICATIONS

El-Koujok, M., et al., "From Monitoring Data to Remaining Useful Life: An Evolving Approach Including Uncertainty," 34th European Safety Reliability & Data Association, ESReDA Seminar and 2nd Joint ESReDA/ESRA Seminar on Supporting Technologies for Advanced Maintenance Information Management, May 2008, San Sebastian, Spain (13 pp.).

* cited by examiner

PROACTIVE CLOUD ORCHESTRATION

SUMMARY

The present disclosure provides one or more improved systems, methods, and/or apparatuses for providing a proactive cloud orchestration scheme. While cloud storage is referenced throughout the present disclosure, the principles disclosed herein are generally application to a collection of servers and storage devices, which may be referred to as cloud storage. In some examples, a health management system may communicate with component(s) of the cloud hardware infrastructure and proactively reconfigure aspect(s) of the component and/or the cloud hardware infrastructure based on a determination that the component may be near failure, e.g., the end of an operational life expectancy or nearing a breakdown condition. For example, the health management system (or a component thereof) may determine a failure probability metric associated with the component. The failure probability metric may be based on monitoring aspects of the component, based on proprietary data relating to similarly configured components, testing diagnostics, data/communication errors associated with the component, historical information, or combinations thereof. Accordingly, the failure probability metric may provide an indication of the likelihood that the component is expected to have a failure within a certain time frame. The health management system may determine an optimization strategy based on the failure probability metric. The optimization strategy may provide a strategy for making one or more changes or reconfigurations to the component and/or other components of the cloud hardware infrastructure to minimize (or eliminate) any impact associated with an expected failure of the component.

The health management system may initiate a reconfiguration procedure to implement the optimization strategy. The reconfiguration procedure may be initiated based on an optimization decision associated with the failure probability metric rising above or falling below a threshold level. An example reconfiguration procedure may be to reduce a processing load of the component. Another example may be to assign low priority tasks (e.g., secondary processing tasks, configure the component as a lower level of storage redundancy) to the component. Yet another example may be to provide an extra level of redundancy to the data/software stored on the component. Similarly, when the failure probability metric indicates the component is not expected to fail within a certain time frame, an example reconfiguration procedure may be to reduce the number of back-up storage locations for the data stored on the component, thereby reducing the total amount of required storage capacity for the cloud hardware infrastructure. Accordingly, the health management system may proactively take action to determine when a component of the cloud hardware infrastructure is expected to fail, rather than wait for the component to fail and scramble to recover from the failure.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
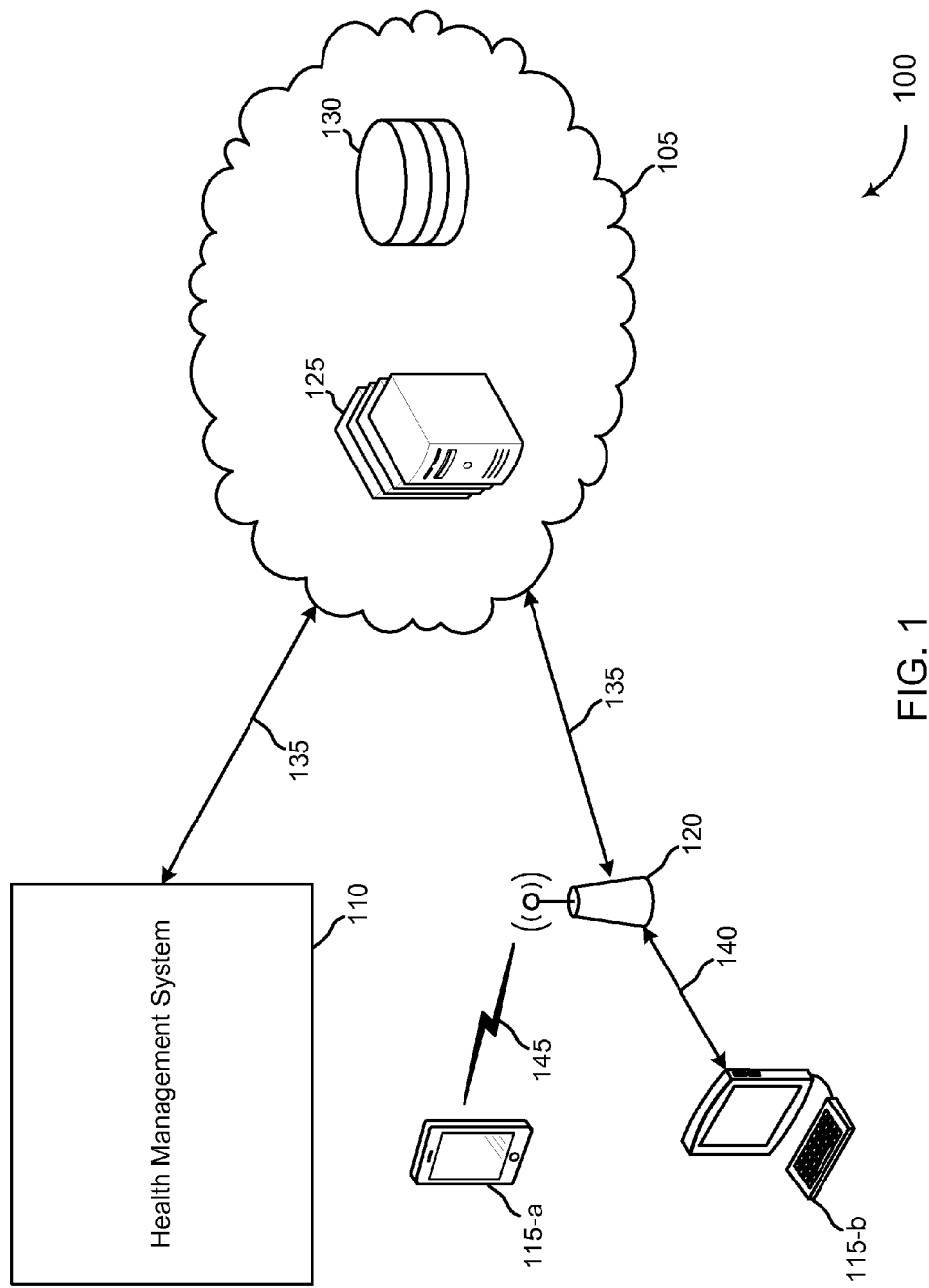
FIG. 1 is a block diagram representation of aspects of a health management system for a cloud hardware infrastructure configured and operated in accordance with various embodiments.

The present disclosure relates to a cloud health management system with proactive cloud orchestration services. Cloud orchestration service are generally reactive in that they monitor the cloud hardware infrastructure waiting for an alarm indicating that a component has failed. Once the failure has occurred, these cloud orchestration services implement policies to move data, processing loads, etc., away from the failed component. Such techniques, however, often result in loss of data at the failed component and down time for users of the cloud service while the policies are being implemented and data/resources are reconfigured. According to aspects of the present disclosure, a proactive cloud health management system monitors aspects of the components of the cloud hardware infrastructure and forecasts an expected failure event for the components. The forecast may provide an indication of a time period (e.g., days, weeks, months, etc.) and/or operational capacity (e.g., read/write cycles, etc.) the component may be expected to continue to perform satisfactorily before experiencing a failure. The cloud health management system of the present disclosure may utilize the forecast (or failure probability determination or metric) to develop policies, procedures, strategies, and the like, for optimizing the cloud hardware infrastructure prior to the component actually failing. As the component nears the end of its expected operational life, the cloud health management system may initiate various policies to reconfigure aspects of the cloud hardware infrastructure to minimize or, in some examples, completely eliminate any impact of the component failure on the cloud hardware infrastructure, its stored data, and its users.

The cloud health management system may determine the failure probability metric associated with the health state of the component based on a wide variety of considerations. For example, the cloud health management system may analyze various historical models associated with the component, e.g., previous operational and performance conditions, operational life, etc., for the same type, model, version, etc., component. Another example may include using self-monitoring, analysis and reporting (SMART) logging technology. The SMART technology may monitor various attributes associated with the component over a period of time during normal use. Yet another example may include the component reporting one or more self-testing metrics, e.g., the component performing proprietary self-tests of various operational metrics. A reliability model metric may also be used, e.g., an indication of various operational attributes such as workload, temperature, etc. Another example consideration may include a cluster migration metric based on monitoring successful and failed cluster migration attempts. The cloud health management system may determine the failure probability metric by combining the individual data points from each consideration $(p_i)(t)$'s) of the $i^{th}$ model. The model continuously improves considering the noted inputs and, in some examples, in consideration of past performance of the model, e.g., self-feedback information associated with the accuracy of the model in forecasting the time a component is expected to fail.

With reference now to FIG. 1, a block diagram illustrates aspects of a system 100 for a cloud health management system 110 configured and operated in accordance with various examples of the present disclosure. The system 100 may include a cloud hardware infrastructure 105 in communication with the cloud health management system 110 as well as one or more client devices 115 (two being shown for reference). Generally, cloud hardware infrastructure 105 may be configured to provide one or more services to client devices 115, e.g., data storage, processing, software, etc. One of ordinary skill in the art would understand cloud hardware infrastructure 105 to include in some embodiments, a collection of networked electronic components. That network may be a private or a public network. The electronic components may include data storage devices (potentially organized into tiers), data processors, power supplies, cooling devices, networking traffic routing modules and other server data movement components. Health management system 110 may monitor components of the cloud hardware infrastructure 105 and determine a failure probability metric for the component based on the monitoring as well as other considerations. When necessary, the health management system 110 may initiate one or more policies or reconfiguration procedures to proactively optimize the cloud hardware infrastructure 105 prior to the component failing. In some embodiments, health of a component may mean how much of the useful life of the component has been used up, what percent of the warranty period is still left, how likely is the component to fail in a defined time period, what amount of time has the component been operating under non-typical or extreme conditions, or other similar understandings of the metric known as health. The proactive reconfiguration procedure may permit the cloud hardware infrastructure 105 to continue to provide uninterrupted services to the client devices 115 when the component fails and without loss of information.

The cloud hardware infrastructure 105 of this example includes one or more servers 125 and one or more data storage devices 130. Examples of the one or more servers 125 may include presentation servers receiving and processing client requests, application servers performing various processing and computational functions, database servers managing aspects of data storage devices 130, etc. Data storage device 130 may include one or more storage mediums storing data, software, etc., for the cloud hardware infrastructure 105. Example storage mediums may include traditional hard-disk drives (HDD), tape drives, solid-state drives (SSD), or combinations thereof. Although not shown in FIG. 1, cloud hardware infrastructure 105 may also include various switches, routers, firewalls, and the like, facilitating signal flow, communications, and security functions for the components of the cloud hardware infrastructure 105. Such components may generally constitute the various hardware components described with respect to the present description and may be monitored by the health management system 110.

Generally, the cloud hardware infrastructure 105 may provide numerous services to users via client devices 115. Example services provided by the cloud hardware infrastructure 105 may include, but are not limited to, business as a service (BaaS) (e.g., online payroll services, etc.), software as a service (SaaS) (e.g., email, virtual desktop, communications, games, "ready to use" software, etc.), platform as a service (PaaS) (e.g., execution runtime, database, web server, development tools, etc.), infrastructure as a service (IaaS) (e.g., virtual machines, servers, storage, load balancers, network functions, etc.), backend as a service (BaaS) (also commonly referred to as mobile BaaS or MBaaS) which may provide backend storage and computational services to mobile application developers. Other services may also be implemented via the cloud hardware infrastructure 105.

Users may access the various services provided by the cloud hardware infrastructure 105 via client devices 115. Client devices 115 may communicate with cloud hardware infrastructure 105 via an access point 120, for example, over wireless link 145 and/or wired link 140. Access point 120 may communicate with the cloud hardware infrastructure 105 over wired communication link 135, e.g., copper wire, optics, Ethernet cables, or combinations thereof. Although system 100 shows an example access point 120 connecting client devices 115 to cloud hardware infrastructure 105, it is to be understood that client devices 115 may access cloud hardware infrastructure 105 via other communication channels, e.g., via a cellular communication link utilizing one or more macro base stations, micro base station, and/or femto base stations. Example client devices 115 may include, but are not limited to a cellular phone, user equipment, mobile device, tablet, laptop computer, desktop computer, hybrid computer, wireless station, wireless link, machine-type device, and the like.

The health management system 110 may include a communication system to facilitate communications with cloud hardware infrastructure 105 via communication link 135, e.g., an optical communication link, a wired communication link, a wireless communication link, or combinations thereof. Health management system 110 may communicate with one or more, or in some examples each, hardware component of the cloud hardware infrastructure 105 and may, in some examples, monitor one or more signals exchanged between the cloud hardware infrastructure 105 and client device 115 to identify missing or corrupt information, e.g., to provide an indication of a potential failure. Although shown separately in system 100, cloud health management system 110 may, in some examples, be a component or apparatus of the cloud hardware infrastructure 105. In other examples, the health management system 110 may be an apparatus separate from the cloud hardware infrastructure 105, e.g., provided as a third-party service or as a service performed remotely.

In some examples, the health management system 110 may monitor, control, or otherwise manage one or more aspects of the health of the cloud hardware infrastructure

105. For example, the health management system 110 may monitor, for the one or more components, various attributes associated with the current operational parameters of the component, historical performance and failure information associated with the component, various testing functions related to each component, etc. The health management system 110 may also consider such attributes as scheduled services for the component, scheduled loading requirements for the component, utilization metrics for the component, and the like. Accordingly, the health management system 110 may monitor and consider a wide variety of attributes related to the component and perform a prognostication function for the component to determine an indication, within a certain confidence level, of the anticipated life expectancy of the component. The indication may be used, in some examples, to determine when the component is expected to experience a degradation in operational performance (e.g., reduced capabilities and/or experience a higher level of errors) or to experience a failure condition.

In some examples, the health management system 110 may determine a failure probability metric associated with the component of the cloud hardware infrastructure 105. The failure probability metric may be a numerical value, in some examples, that conveys an indication of the expected useful remaining life of the component, e.g., the time until the component fails (partially or completely). For example, the failure probability metric may be an integer between 1 and 10, between 1 and 100, etc., wherein a higher integer indicates the component is approaching its end of life expectancy, e.g., an integer of 90 may indicate the component has 10 percent of its useful operational life remaining. Conversely in a different example, a lower integer, e.g., 10, may indicate that the component has 10 percent of its useful operational life remaining. Another example of the failure probability metric may be a fractional number between 0 and 1. Various schemes may be implemented using the failure probability metric to convey the indication of time remaining until the expected failure of the component.

As another example, the health management system 110 may develop one or more policies or strategies for optimizing the cloud hardware infrastructure 105 based on the failure probability metric. The optimization strategy may include steps, safeguards, reconfigurations, changes in priorities, etc., associated with the component to compensate for the expected failure of the component and to minimize or reduce its impact on operations of the cloud hardware infrastructure 105. Different optimization strategies may be developed based on the time (or operational life) remaining until the expected failure of the component. For example, the optimization strategy may be determined based on whether the component is within a first time window before failure, within a second time window before failure, etc. Additionally or alternatively, the optimization strategy may provide for improved operations and reduced requirements for the cloud hardware infrastructure 105. For example, when a component is relatively new and the failure probability metric indicates that there is substantial time until a failure condition for the component, the optimization strategy may include reducing the number of back-ups or redundancies associated with the component. This may reduce the hardware infrastructure required to implement the cloud hardware infrastructure 105.

Additional functions that may be provided by the health management system 110 include, for example, initiating a reconfiguration procedure based on the optimization strategy or strategies for the component. The reconfiguration procedure may be a software-based reconfiguration, a data-based reconfiguration, a hardware-based reconfiguration, or combinations thereof. Generally, the reconfiguration procedure may provide a means for the health management system 110 to mitigate or eliminate any impact caused by the component upon its expected failure. In some examples, the reconfiguration procedure may include creating a second or third backup copy of data being stored on a data storage device 130 when the data storage device 130 is expected to fail within a certain time window. Example reconfiguration procedures may be to reassign computational loads to other servers when a server is expected to fail. Example reconfiguration procedures may be to assign lower priority functions to the component expected to fail, e.g., lower level computational services, assign third or fourth layer backup storage levels, and the like. Accordingly, the component may continue to be used by the cloud hardware infrastructure 105, but in a capacity that minimizes any impact caused by its expected failure. Additional examples of reconfiguration procedures may include relocating virtual machine (VM) resources, increased temperature monitoring and management for the component, etc.

Additional reconfiguration procedures may relate to optimizing the cloud hardware infrastructure 105 based on the failure probability metric indicating that the component is not expected to fail within a certain time window, e.g., the component is healthy and reliable. For example, the reconfiguration procedure may be to reduce the number of backup copies of data being stored on the component. Another example may be to utilize more of the component while it is healthy, e.g., to utilize the maximum storage capacity of the component, to assign extra computational requirements to the component. Another example may be to extend the time period between service inspections of the component.

As can be appreciated, the health management system 110 may provide an improved cloud orchestration function by forecasting when the components of the cloud hardware infrastructure 105 are likely to fail and by capitalizing on components that are not expected to fail within a certain time period. Accordingly, the health management system 110 may provide for seamless resource provisioning while minimizing or eliminating an impact on performance or downtime when a component fails. The health management system 110, in certain aspects, may eliminate the reactionary steps taken by conventional health management systems.

Figure 2:
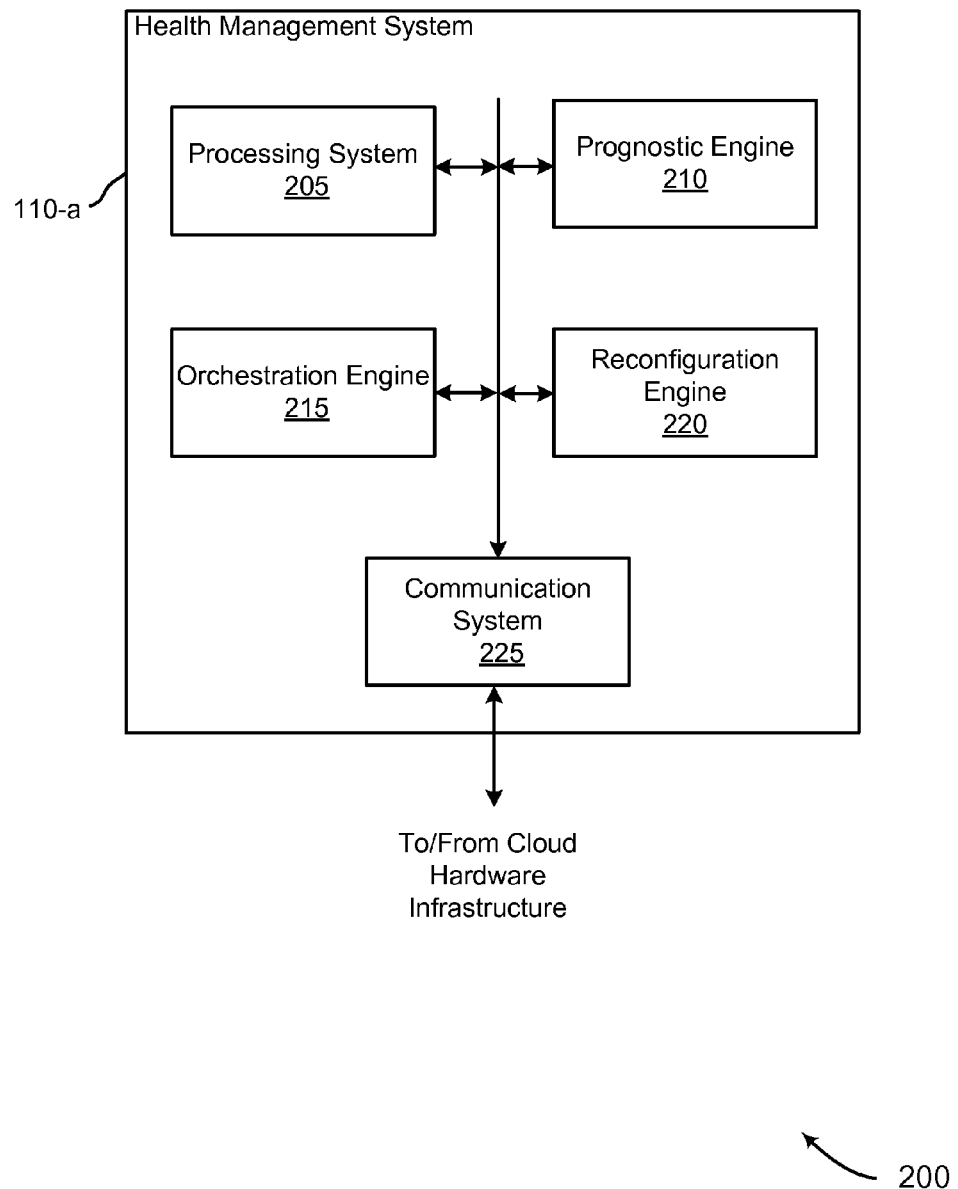
FIG. 2 is a block diagram representation of a health management system in accordance with various embodiments.

With reference now to FIG. 2, an example 200 of a health management system 110-*a* is discussed. The health management system 110-*a* may be an example of the health management system 110 described with reference to FIG. 1, for example. In this example, the health management system 110-*a* may include processing system 205, prognostic engine 210, orchestration engine 215, reconfiguration engine 220, and communication system 225. Each of the noted modules or engines may provide one or more functions related to operation of the health management system 110-*a*. In some examples, each of the noted modules or engines may be combined with the processing system 205 as one or more functional elements or sub-components.

The processing system 205 may monitor, manage, or control one or more processing functions for the health management system 110-*a*. The processing system 205 may be a general-purpose or special-purpose processor that performs operations of the health management system 110-*a*. The processing system 205 may include any combination of microprocessors, digital signal processor (DSPs), application specific integrated circuits (ASICs), field programmable gate arrays (FPGAs), or other equivalent integrated or discrete logic circuitry suitable for performing the various functions described herein. The processing system 205 may be in communication with a memory (not shown), which may store computer readable code that may be executed by the processing system 205 to perform various operations of the health management system 110-*a*. In some examples, the processing system 205 may execute instructions to perform the functions of the prognostic engine 210, the orchestration engine 215, the reconfiguration engine 220, and/or the communication system 225.

The prognostic engine 210 may monitor, control, or otherwise manage various aspects of determining a failure probability metric for the health management system 110-*a*. For example, the prognostic engine may consider various attributes associated with a component of a cloud hardware infrastructure to determine the failure probability metric for the component. The failure probability metric may provide an indication of the time period before the component is likely to fail. Accordingly, the failure probability metric may provide a basis for which one or more components of the health management system 110-*a* may require precautionary steps to minimize or eliminate any downtime or loss of information when the component fails as well as to optimize performance and management of the cloud hardware infrastructure while the component is performing in a healthy state. As will be discussed in greater detail below, the prognostic engine 210 may consider a wide variety of attributes relating to the component to determine the failure probability metric.

The orchestration engine 215 may monitor, control, or otherwise manage one or more aspects of determining an optimization strategy for the health management system 110-*a*. The optimization strategy may be based on the failure probability metric determined for the components of the cloud hardware infrastructure. The optimization strategy may be updated as the probability failure metric for the component changes. In some examples, the optimization strategy may provide for improved performance and management of the cloud hardware infrastructure based on components whose failure probability metric indicates they are operating in a healthy condition and likely have a substantial time period (or operational capacity) before a failure occurs. In some examples, the optimization strategy may provide for mitigating or eliminating difficulties associated with the failure of the component of the cloud hardware infrastructure. For example, the orchestration engine 215 may determine optimization strategies to protect data or information stored on the component to prevent data loss as well as transferring various functions to other components to eliminate downtime associated with the component failure. As will be discussed in greater detail below, the orchestration engine 215 may develop numerous optimization strategies for the components of the cloud hardware infrastructure, based on the time before the components are forecasted to fail.

The reconfiguration engine 220 may monitor, control, or otherwise manage one or more aspects of initiating or implementing the optimization strategies for the health management system 110-*a*. The reconfiguration engine 220 may communicate with the orchestration engine 215, the prognostic engine 210, or other components of the health management system 110-*a* to determine when to initiate the appropriate reconfiguration procedure. In some examples, the reconfiguration procedure may include transferring, based on a failure probability metric that indicates the component will fail within a time period, one or more resources of the cloud hardware infrastructure to a different component. Example resources may include, but are not limited to, a data resource, a computational resource, a storage resource, a communication resource, or combinations thereof. The failure probability metric may be used to determine an optimization strategy that can be initiated for transfer function. Accordingly, the reconfiguration procedure may redirect resources away from components expected to fail with a certain time period, or at least reduce the impact of the component failure by assigning lower priority functions to the component.

In another example, the reconfiguration procedure may include reducing, based on a failure probability metric that indicates the component will not fail within a time period, the resources associated with a redundancy function of the cloud hardware infrastructure. For example, a number of redundant storage locations of a storage system may be configured and reduced according to the reconfiguration feature. Other reconfiguration procedures may be to change the inspection schedule associated with the component based on the failure probability metric, to determine a schedule for various testing protocols associated with the component, to change a utilization load for the component (e.g., assign more or less computational or storage requirements to the component), to alter various environmental parameters for the component (e.g., temperature, humidity level, etc.), and the like. As can be appreciated, a variety of reconfiguration procedures may be initiated using optimization strategies considering the failure probability metric for the component.

The communication system 225 may monitor, control, or otherwise manage one or more aspects of communications for the health management system 110-*a*. For example, the communication system 225 may provide a communication interface between the health management system 110-*a* and the cloud hardware infrastructure including the components being monitored and managed. In some examples, the communication system 225 may implement one or more protocols for communicating via a wired communication link, a wireless communication link, or a combination thereof. Example wired communication links include, but are not limited to, an Ethernet communication link utilizing internet protocol (IP) communications techniques. The IP communications may be packet-based communications. Example wireless communication links include, but are not limited to, cellular communication links (e.g., long term evolution (LTE), advanced LTE (LTE-A), heterogeneous cellular communication links, wireless local area network (WLAN) wireless links, also referred to as Wi-Fi communication links, Bluetooth communication links, or combinations thereof. Accordingly, the communication system 225 may support communication interface functions utilizing a wide variety of communication protocols for the health management system 110-*a*. In some examples, the communication system 225 may be in communication with each component of the cloud hardware infrastructure via a common communication link or may be in communication with the components of the cloud hardware infrastructure via multiple communication links.

Figure 3:
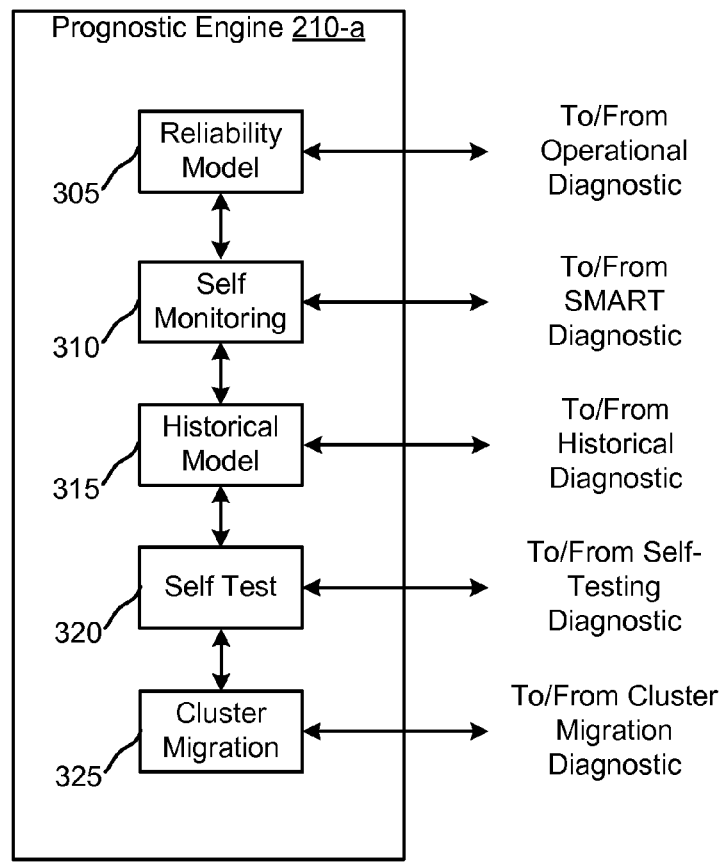
FIG. 3 is a block diagram representation of a prognostic engine in accordance with various embodiments.

With reference now to FIG. 3, a block diagram 300 illustrates an example of prognostic engine 210-*a* according to various embodiments. Prognostic engine 210-*a* may be an example of the prognostic engine 210 described with reference to FIG. 2, for example. Generally, the prognostic engine 210-*a* may manage or determine various aspects of determining a failure probability metric for a component, or components, of a cloud hardware infrastructure system for the presently described health management system. The prognostic engine 210-*a* may include a reliability module 305, a self monitoring module 310, a historical model module 315, a self test module 320, and a cluster migration module 325. Each of these modules may be implemented using various hardware, software, and/or firmware instructions being executed on a processing system, such as the processing system 205 described with reference to FIG. 2.

Reliability model module 305 may exchange information with one or more operational diagnostic functions associated with the component of the cloud hardware infrastructure. For example, the operational diagnostic functions may utilize various algorithms to determine a time to failure attribute for the component. In some examples, the operations diagnostic function may monitor the workload (e.g., utilization metric) performed by the component, the temperature of the component or its operating environment, and/or other operational parameters associated with the component that may provide an indication of the expected time until the component fails.

Self monitoring module 310 may exchange information with one or more SMART diagnostic functions associated with the component of the cloud hardware infrastructure. Generally, the SMART diagnostic functions may provide information indicative of various monitored features relating to the component. For example, the SMART diagnostic functions may provide an indication of various errors associated with the component (e.g., data packet errors, lost information or data packets, etc.) and the like. The output of the SMART diagnostic functions may provide an indication of an expected time to failure for the component. For example, a rapidly rising quantity of detected errors may indicate that the component is experiencing problems that may lead to a premature failure.

Historical model module 315 may exchange information with one or more historical diagnostic functions associated with the component of the cloud hardware infrastructure. Generally, the historical model module 315 may analyze various data sources associated with the monitored component, and similar components, to identify an average life expectancy for the component within a defined operational environment, causes of component failures in similar deployments, and the like. In some examples, the historical diagnostic functions may utilize proprietary information held by a manufacturer, for example, of the components based on feedback information for the components, such as the one being monitored. Accordingly, the historical model module 315 may determine and output information that can be utilized to determine a time until an expected failure of the component.

Self test module 320 may exchange information with one or more self-test diagnostic functions associated with the component of the cloud hardware infrastructure. In some examples, the self-testing diagnostic functions may include one or more tests being performed by the component as a part of its normal operating procedures. Example tests include, but are not limited to, feedback information associated with dynamic storage tiering (DST) operations, internet data distribution (IDD) functions, and the like. The self-testing diagnostic functions may be separate from testing and monitoring functions related to the SMART technology.

Cluster migration module 325 may exchange information with one or more cluster migration diagnostic functions associated with the component of the cloud hardware infrastructure. Generally, the cluster migration diagnostic functions may monitor and analyze various attributes for the component in relation to cluster migration functions. For example, cluster migration functions may include transferring various data stores from a source component to a destination component and, in some instances, via an intermediary component. As the data store is being written to, and erased from one or more of the components, integrity checks and error reports may provide an indication of the expected time until failure of the component.

In some examples, one or more of the functions described above with respect to the prognostic engine 210-a may be performed in an iterative fashion. Each iteration may provide additional data points for analysis in determining the failure probability metric for the component.

It is to be understood that the modules discussed above may be implemented as one or more components, in hardware, software, firmware, etc., of the prognostic engine 210-a. As one example, a processing system such as the processing system 205 of FIG. 2 may store firmware instructions that when executed by the processing system may independently determine the failure probability metric for the component. Accordingly, the failure probability metric may be determined autonomously, e.g., without direction or control, from one or more aspects of the cloud hardware infrastructure. Consequently, a confidence level may be ascribed to the failure probability metric.

Figure 4:
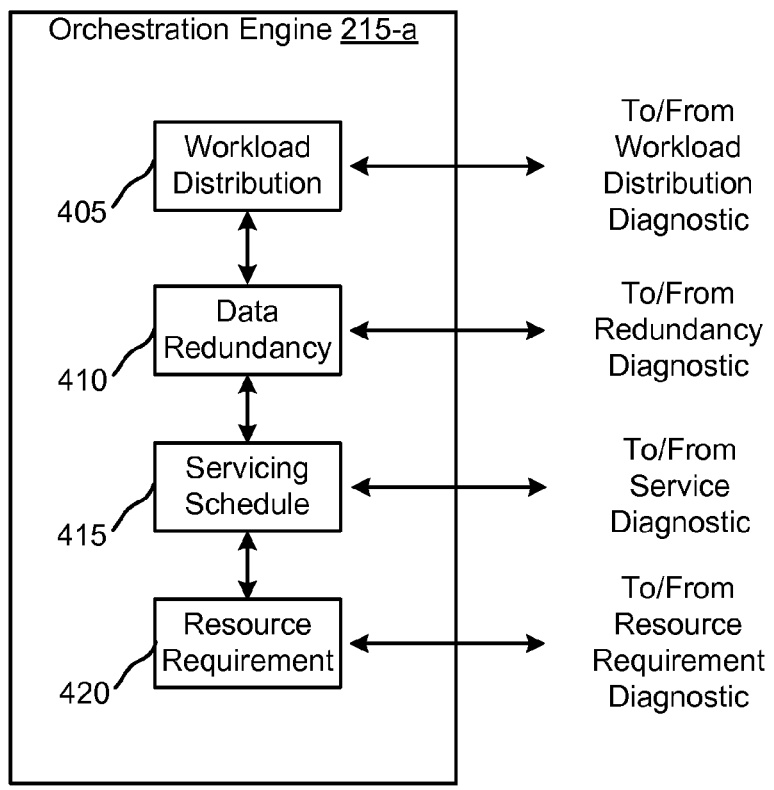
FIG. 4 is a block diagram representation of a orchestration engine in accordance with various embodiments.

With reference now to FIG. 4, a block diagram 400 illustrates an example of orchestration engine 215-a according to various embodiments. Orchestration engine 215-a may be an example of the orchestration engine 215 described with reference to FIG. 2, for example. Generally, the orchestration engine 215-a may manage or control various aspects of determining an optimization strategy based on the failure probability metric for the component of the cloud hardware infrastructure system for the presently described health management system. The orchestration engine 215-a may include a workload distribution module 405, a data redundancy module 410, a servicing schedule module 415, and a resource requirement module 420. Each of these modules may be in communication with each other, either directly or indirectly. Each of these modules may be implemented using various hardware, software, and/or firmware instructions being executed on a processing system, such as the processing system 205 described with reference to FIG. 2.

As previously discussed, the orchestration engine 215-a may generally develop various policies or optimization strategies based on the failure probability metric for the components of the cloud hardware infrastructure. The optimization strategy may capitalize on a healthy component by reducing hardware requirements, for example, and may mitigate any impact associated with component failure.

Workload distribution module 405 may exchange information with one or more workload distribution diagnostic functions associated with the component of the cloud hardware infrastructure. For example, the optimization strategy may include analyzing the workload distribution for the components of the cloud hardware infrastructure. Some optimization strategies may include shifting the workload distribution away from a component expected to fail within a time window. Another optimization strategy may include shifting a workload distribution to a component not expected to fail within a time window. Accordingly, the workload distribution module 405 may more effectively distribute workloads between the components of the cloud hardware infrastructure based on the failure probability metric for the respective components.

Data redundancy module 410 may exchange information with one or more redundancy diagnostic functions associated with the component of the cloud hardware infrastructure. For example, various optimization strategies may include changing the levels of redundancy for various component functions of the cloud hardware infrastructure. For a failure probability metric indicating that a component will not likely fail within a time window, the number of redundant functions can be reduced, thereby conserving valuable hardware resources. For a failure probability metric indicating that a component will likely fail within a time window, the number of redundant functions can be increased, thereby mitigating any consequences associated with the component failing.

Servicing schedule module 415 may exchange information with one or more service diagnostic functions associated with the component of the cloud hardware infrastructure. Generally, the optimizing strategy may include determining a servicing schedule for the component based on the associated failure probability metric of the component. The servicing schedule may include various inspections, servicing, etc., and other functions for the component. In some examples, fewer inspections may be scheduled for component that are not expected to fail within a time window and, correspondingly, more inspections may be afforded to components that are expected to fail within a time window.

Resource requirement module 420 may exchange information with one or more resource diagnostic functions associated with the component of the cloud hardware infrastructure. In some examples, the optimization strategy may include allocating resource requirements between components. The allocation may be based on scheduled requirements such as scheduled cluster migrations, computational functions, etc. In one example, an optimization strategy may include scheduling heavy resource requirements away from components expected to fail within a time period.

It is to be understood that the modules discussed above may be implemented as one or more components, in hardware, software, firmware, etc., of the orchestration engine 215-a. As one example, a processing system such as the processing system 205 of FIG. 2 may store firmware instructions that when executed by the processing system may independently determine the optimization strategy for the component. Accordingly, the optimization strategy may be determined autonomously, e.g., without direction or control, from one or more aspects of the cloud hardware infrastructure. Consequently, a confidence level may be ascribed to the optimization strategy.

Figure 5:
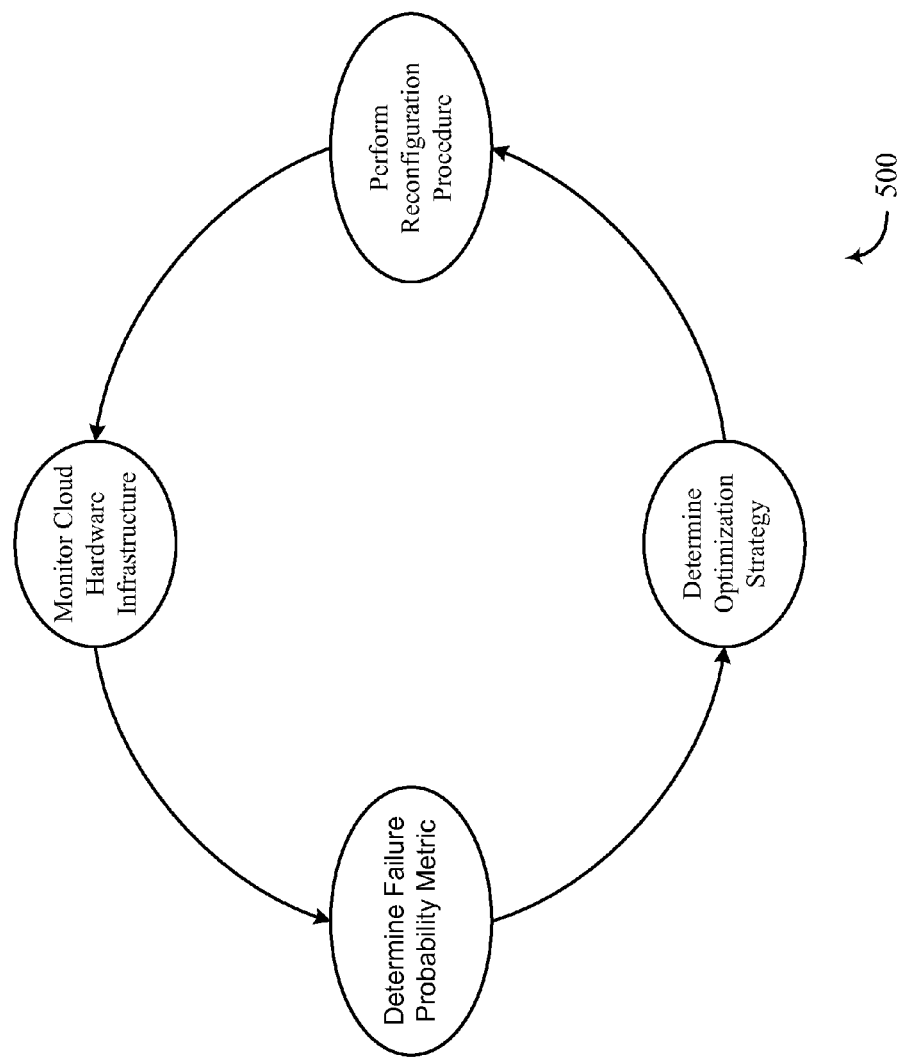
FIG. 5 is a state diagram representation of proactive cloud orchestration in accordance with various embodiments.

FIG. 5 illustrates an example state diagram 500 representation of proactive cloud orchestration techniques in accordance with various embodiments of the present description. For clarity, the state diagram 500 is described below with reference to a health management system, such as the health management system 110, or one or more components of the health management system 110, described with reference to FIGS. 1, 2, 3, and/or 4. In one implementation, a health management system 110, or a processor module thereof, may execute one or more sets of codes to control the functional elements of the device to perform the functions described below.

In some examples, the state diagram 500 may begin at a monitoring state by monitoring one or more components of a cloud hardware infrastructure system. The monitoring state may include various testing, reliability, SMART technology functions, etc., associated with the component. The monitoring state may be performed in an iterative fashion and may provide numerous data point associated with the health of the monitored component.

The state diagram 500 may move to a prognostication state by determining a failure probability metric for the monitored component, or each of the monitored components of the cloud hardware infrastructure. The failure probability metric may provide an indication or a forecast of the time until the component is expected to fail or otherwise enter a failure condition. The time until the component is expected to fail may include a day attribute, a week attribute, a month attribute, a quarter attribute, a semi-annual attribute, a year attribute, and the like. In another example, the time until the component is expected to fail may include a performance attribute, e.g., the number of read/write cycles remaining, the computational load capability of the component, etc. Accordingly, the failure probability metric may support forecasting in a wide variety of formats.

The state diagram 500 may move to an optimization state by determining an optimization strategy for the monitored component, or each of the monitored components of the cloud hardware infrastructure. The optimization strategy may generally provide a plan or policy that is based on the failure probability metric for the component. The optimization strategy may provide for reassigning various resources of the cloud hardware infrastructure, for moving various functions, data, software, etc., to different components of the cloud hardware infrastructure, etc. The optimization strategy may be updated continuously (e.g., in real time) and/or on a recurring schedule based on changes to the failure probability metric for the component.

The state diagram 500 may move to a reconfiguration state by initiating a reconfiguration procedure to implement the optimization strategy for the monitored component, or each of the monitored components of the cloud hardware infrastructure. The reconfiguration procedure may include reconfiguring one or more hardware components, software components, data storage components, and the like, for the cloud hardware infrastructure. In some examples, the reconfiguration state may be triggered by a failure probability metric rising above or falling below a predetermined threshold level. For example, various optimization strategies may be determined and in place and triggered based on a determined failure probability metric for the components of the cloud hardware infrastructure. As the failure probability metric changes due to changes in the monitored attributes, the reconfiguration procedure may be initiated automatically, i.e., without user intervention. In other examples, the changes in the monitored attributes contributing to the updated failure probability metric may trigger an alarm indication whereas a user initiates the reconfiguration procedure.

The state diagram 500 may be a continuous process that is constantly being updated, initiated, etc., based on the performance metrics of the cloud hardware infrastructure. Accordingly, the state diagram 500 may provide a real-time health management function for the cloud hardware infrastructure that proactively mitigates and, in some examples, eliminates data loss and downtime associated with component failure.

Figure 6:
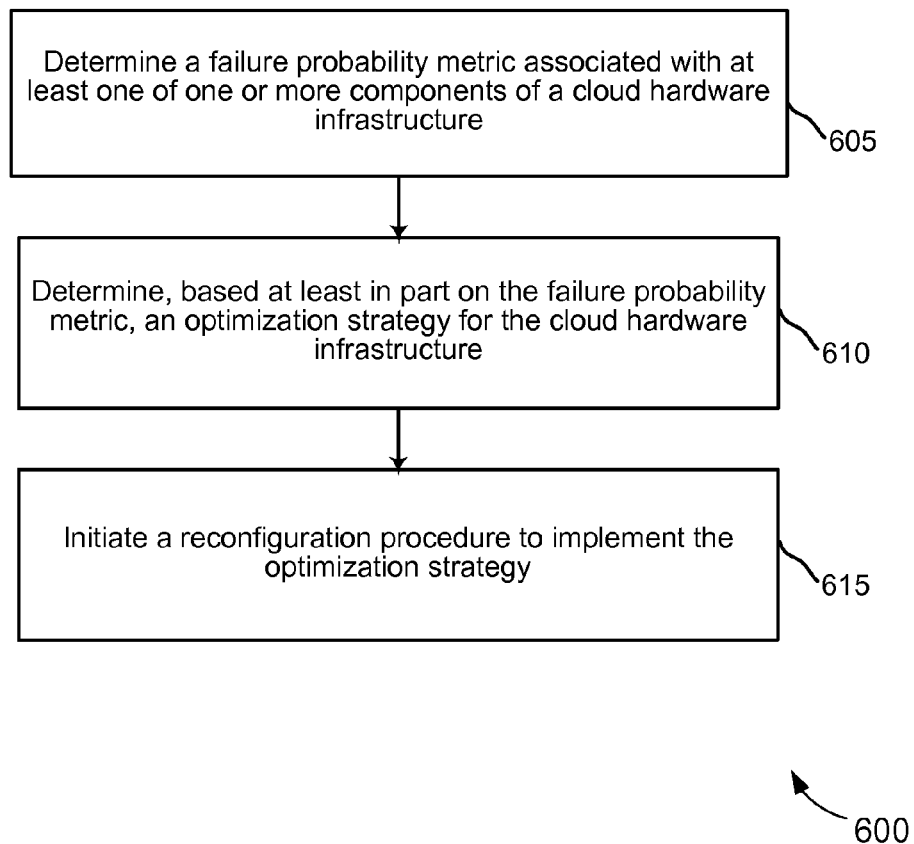
FIG. 6 is a flowchart illustration of the operational steps of a method for providing proactive cloud orchestration in accordance with various embodiments.

FIG. 6 is a flowchart of a method 600 for providing proactive cloud orchestration according to various embodiments. For clarity, the method 600 is described below with reference to aspects of a health management system 110, and/or sub-components thereof, described with reference to FIGS. 1, 2, 3, 4, and/or 5. In one implementation, a health management system 110, or a processor module thereof, may execute one or more sets of codes to control the functional elements of the device to perform the functions described below.

At block 605, the health management system may determine a failure probability metric associated with at least one component of a cloud hardware infrastructure. The failure probability metric may provide an indication of a time until the component is expected to fail, e.g., the number of days, weeks, months, etc. and/or the operational capabilities of the component before it is expected to fail. At block 610, the health management system may determine, based at least in part on the failure probability metric, an optimization strategy for the cloud hardware infrastructure. The optimization strategy may provide a series of one or more steps that can be taken to mitigate the component failure. At block 615, the health management system may initiate a reconfiguration procedure to implement the optimization strategy. The reconfiguration procedure may include reconfiguration of one or more of a hardware function, a software function, a data storage function, etc.

Figure 7:
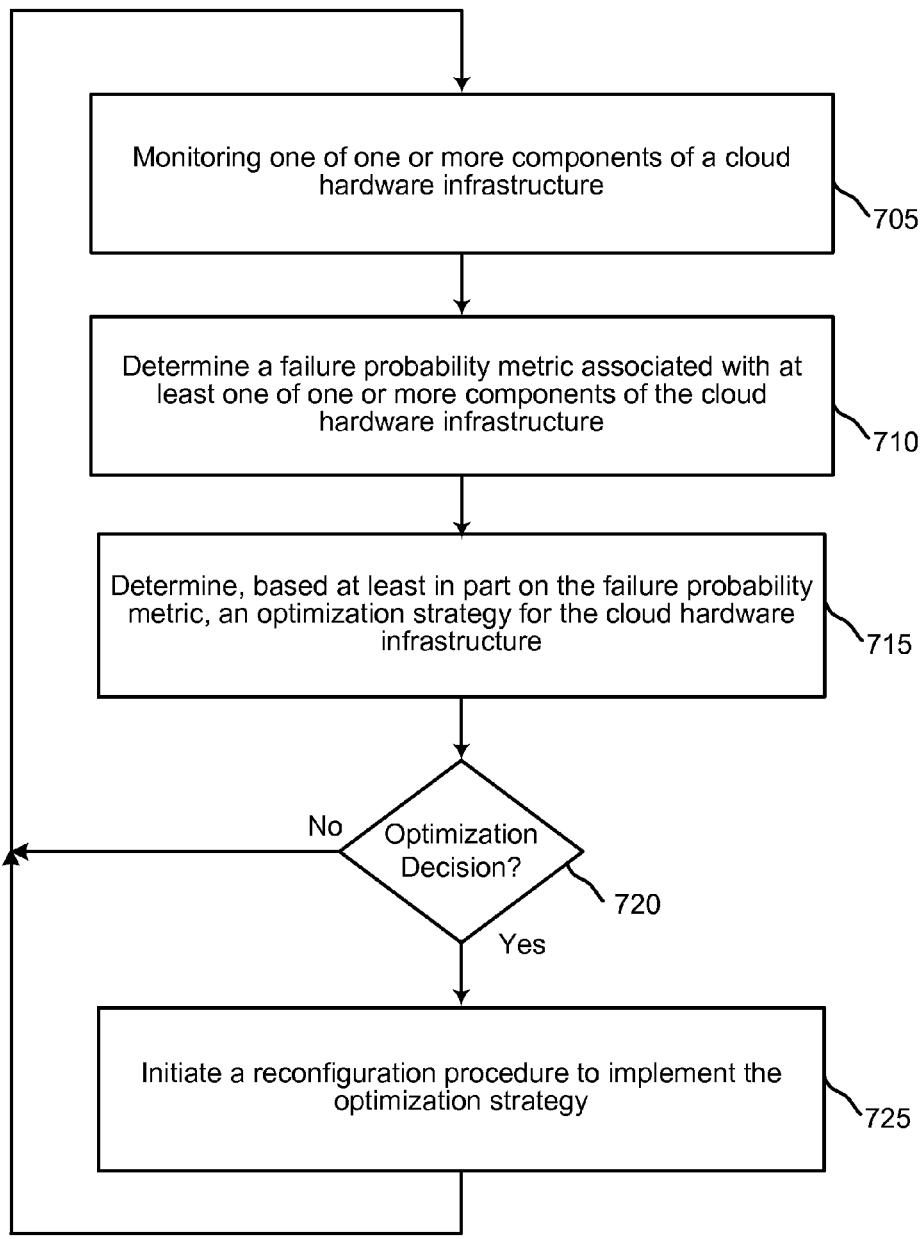
FIG. 7 is a flowchart illustration of the operational steps of a method for providing proactive cloud orchestration in accordance with various embodiments.

FIG. 7 is a flowchart of a method 700 for providing proactive cloud orchestration according to various embodiments. For clarity, the method 700 is described below with reference to aspects of a health management system 110, and/or sub-components thereof, described with reference to FIGS. 1, 2, 3, 4, and/or 5. In one implementation, a health management system 110, or a processor module thereof, may execute one or more sets of codes to control the functional elements of the device to perform the functions described below.

At block 705, the health management system may monitor one or more components of a cloud infrastructure. The monitoring may include receiving various feedback information associated with the component, e.g., SMART technology feedback information, self-testing feedback information, reliability feedback information, and the like. At block 710, the health management system may determine a failure probability metric associated with at least one component of a cloud hardware infrastructure. The failure probability metric may be based, at least in part, on the monitoring functions and provide an indication of a time until the component is expected to fail, e.g., the number of days, weeks, months, etc. and/or the operational capabilities of the component before it is expected to fail. The failure probability metric may also be based on various historical information associated with the component, or similar components. At block 715, the health management system may determine, based at least in part on the failure probability metric, an optimization strategy for the cloud hardware infrastructure. The optimization strategy may provide a series of one or more steps that can be taken to mitigate the component failure.

At block 720, the health management system may determine if an optimization decision has been reached. For example, the optimization decision may be based on changes to the failure probability metric where changes above or below a threshold value may provide an indication that one or more of the optimization strategies may need to be implemented. If the optimization decision has not been reached, the method returns to block 705 where the health management system may continue to monitor the one or more components of the cloud hardware infrastructure. If the optimization decision has been met, the method moves to block 725 where the health management system may initiate a reconfiguration procedure to implement the optimization strategy. The reconfiguration procedure may include reconfiguration one or more of a hardware function, a software function, a data storage function, etc.

The foregoing description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method, comprising:
   determining a failure probability metric associated with at least one component of a cloud hardware infrastructure, the determining comprising analyzing, for the at least one component, a self-testing metric, a cluster migration metric, or combination thereof;
   determining, based at least in part on the failure probability metric, an optimization strategy for the cloud hardware infrastructure; and initiating a reconfiguration procedure to implement the optimization strategy.

2. The method of claim 1, wherein determining the failure probability metric comprises:
analyzing, for the at least one component, one or more historical models associated with the at least one component, a reliability model associated with the at least one component, a self-monitoring feedback metric from the at least one component, or combinations thereof.

3. The method of claim 2, further comprising:
analyzing the one or more historical models, the reliability model, the self-monitoring feedback metric, the self-testing metric, the cluster migration metric, or combinations thereof, a predetermined number of iterations to determine the failure probability metric.

4. The method of claim 2, wherein the failure probability metric comprises an indication of a time until an expected failure for the at least one component of the cloud hardware infrastructure.

5. The method of claim 1, wherein determining the optimization strategy comprises:
determining a resource utilization metric associated with the cloud hardware infrastructure; and
determining the optimization strategy based at least in part on the resource utilization metric and the failure probability metric.

6. The method of claim 5, wherein the resource utilization metric is based at least in part on a workload distribution of the cloud hardware infrastructure, a data redundancy metric for one or more data storage components of the cloud hardware infrastructure, a servicing schedule for the cloud hardware infrastructure, a resource requirements metric for the cloud hardware infrastructure, or combinations thereof.

7. The method of claim 1, wherein the reconfiguration procedure comprises:
transferring, based at least in part on a failure probability metric that indicates the at least one component will fail within a time period, one or more resources of the cloud hardware infrastructure to a different component.

8. The method of claim 7, wherein the one or more resources comprises a data resource, a computational resource, a storage resource, a communication resource, or combinations thereof.

9. The method of claim 1, wherein the reconfiguration procedure comprises:
reducing, based at least in part on a failure probability metric that indicates the at least one component will not fail within a time period, resources associated with a redundancy function of the cloud hardware infrastructure.

10. The method of claim 9, wherein reducing the resources of the redundancy function comprises reducing a number of redundant storage locations of a storage system.

11. An apparatus, comprising:
a prognostic engine configured to determine a failure probability metric associated with at least one component of a networked storage collection, the determining comprising analyzing, for the at least one component, a self-testing metric, a cluster migration metric, or combination thereof;
an orchestration engine configured to determine, based at least in part on the failure probability metric, an optimization strategy for the networked storage collection; and
a reconfiguration engine configured to initiate a reconfiguration procedure to implement the optimization strategy; and
a hardware processing system executing software instructions to perform functions of the prognostic engine, the orchestration engine, and the reconfiguration engine.

12. The apparatus of claim 11, wherein the prognostic engine is further configured to analyze, for the at least one component, one or more historical models associated with the at least one component, a reliability model associated with the at least one component, a self-monitoring feedback metric from the at least one component, a self-testing metric, or combinations thereof, to determine the failure probability metric.

13. The apparatus of claim 11, wherein the failure probability metric comprises an indication of a time until an expected failure for the at least one component of the networked storage collection.

14. The apparatus of claim 11, wherein the orchestration engine is further configured to determine a resource utilization metric associated with the networked storage collection, and to determine the optimization strategy based at least in part on the resource utilization metric and the failure probability metric.

15. The apparatus of claim 14, wherein the resource utilization metric is based at least in part on a workload distribution of the networked storage collection, a data redundancy metric for one or more data storage components of the networked storage collection, a servicing schedule for the networked storage collection, a resource requirements metric for the networked storage collection, or combinations thereof.

16. The apparatus of claim 11, wherein the reconfiguration engine is configured to transfer, based at least in part on a failure probability metric that indicates the at least one component will fail within a time period, one or more resources of the networked storage collection to a different component.

17. The apparatus of claim 11, wherein the reconfiguration engine is configured to reduce, based at least in part on a failure probability metric that indicates the at least one component will not fail within a time period, resources associated with a redundancy function of the networked storage collection.

18. A cloud hardware infrastructure management system, comprising:
one or more components of a cloud hardware infrastructure;
a communication system providing communications between at least a portion of the one or more components of the cloud hardware infrastructure; and
a health management system configured to:
determine a failure probability metric associated with at least one of the one or more components of the cloud hardware infrastructure, the determining comprising analyzing, for at least one of the one or more components, a self-testing metric, a cluster migration metric, or combination thereof;
determine, based at least in part on the failure probability metric, an optimization strategy for the cloud hardware infrastructure management system; and
initiate a reconfiguration procedure to implement the optimization strategy.

19. The system of claim 18, wherein the health management system is configured to determine, based at least in part on the failure probability metric, a time until an expected failure for the at least one component of the cloud hardware infrastructure management system.

20. A non-transitory computer-readable medium containing processor-executable instructions that, when executed by a processor, cause the processor to:
- determine a failure probability metric for at least one component of a storage device of a cloud hardware system, the determining comprising analyzing, for the at least one component, a self-testing metric, a cluster migration metric, or combination thereof;
- if the failure probability metric is greater than a threshold metric, then determine an optimization strategy for the cloud hardware system; and
- initiate a reconfiguration procedure to implement the optimization strategy.

* * * * *